United States Patent
Nakahira et al.

(10) Patent No.: US 12,284,531 B2
(45) Date of Patent: Apr. 22, 2025

(54) RADIO SIGNAL STRENGTH INFORMATION CALCULATION METHOD, CONTROL APPARATUS AND PROGRAM

(71) Applicant: NIPPON TELEGRAPH AND TELEPHONE CORPORATION, Tokyo (JP)

(72) Inventors: Toshiro Nakahira, Tokyo (JP); Motoharu Sasaki, Tokyo (JP); Koichi Ishihara, Tokyo (JP); Takatsune Moriyama, Tokyo (JP); Yasushi Takatori, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 315 days.

(21) Appl. No.: 18/003,239

(22) PCT Filed: Aug. 26, 2020

(86) PCT No.: PCT/JP2020/032213
§ 371 (c)(1),
(2) Date: Dec. 23, 2022

(87) PCT Pub. No.: WO2022/044170
PCT Pub. Date: Mar. 3, 2022

(65) Prior Publication Data
US 2023/0262476 A1  Aug. 17, 2023

(51) Int. Cl.
*H04W 16/18* (2009.01)
*H04B 17/318* (2015.01)
*H04B 17/391* (2015.01)

(52) U.S. Cl.
CPC .......... *H04W 16/18* (2013.01); *H04B 17/318* (2015.01); *H04B 17/3913* (2015.01)

(58) Field of Classification Search
CPC ..... H04W 16/18; H04W 16/22; H04W 24/06; H04B 17/318; H04B 17/3913
See application file for complete search history.

(56) References Cited

U.S. PATENT DOCUMENTS

2002/0009992 A1 * 1/2002 Jensen ................. H04W 16/18
                                                                                          455/446
2018/0332557 A1 * 11/2018 Vuornos ................... G06F 8/61

OTHER PUBLICATIONS

IEEE Std 802.Nov. 2016, Dec. 2016.
(Continued)

*Primary Examiner* — Fred A Casca
(74) *Attorney, Agent, or Firm* — IPUSA, PLLC

(57) ABSTRACT

A radio signal strength information calculation method performed by a control apparatus includes: calculating radio information regarding each of a plurality of meshes into which an area where base stations are placed is divided and generating mesh radio information; and placing a virtual base station at a position to where any of the base stations would be moved in the area, and calculating radio signal strength information between a plurality of base stations including the base stations and the virtual base station based on the mesh radio information.

7 Claims, 10 Drawing Sheets

(56) References Cited

OTHER PUBLICATIONS

Takuto Arai, Daisuke Goto, Masashi Iwabuchi, Tatsuhiko Iwakuni, Kazuki Maruta, "Proposal of adaptive movable AP System for realizing offloading efficiency enhancement," IEICE technical report, RCS2016-43, pp. 107 to 112, May 2016.

J. Macqueen, "Some Methods for Classification and Analysis of Multivariate Observations," Proc. of 5th Berkeley Symposium on Mathematical Statistics and Probability, pp. 281 to 297, 1967.

* cited by examiner

[Fig. 1]
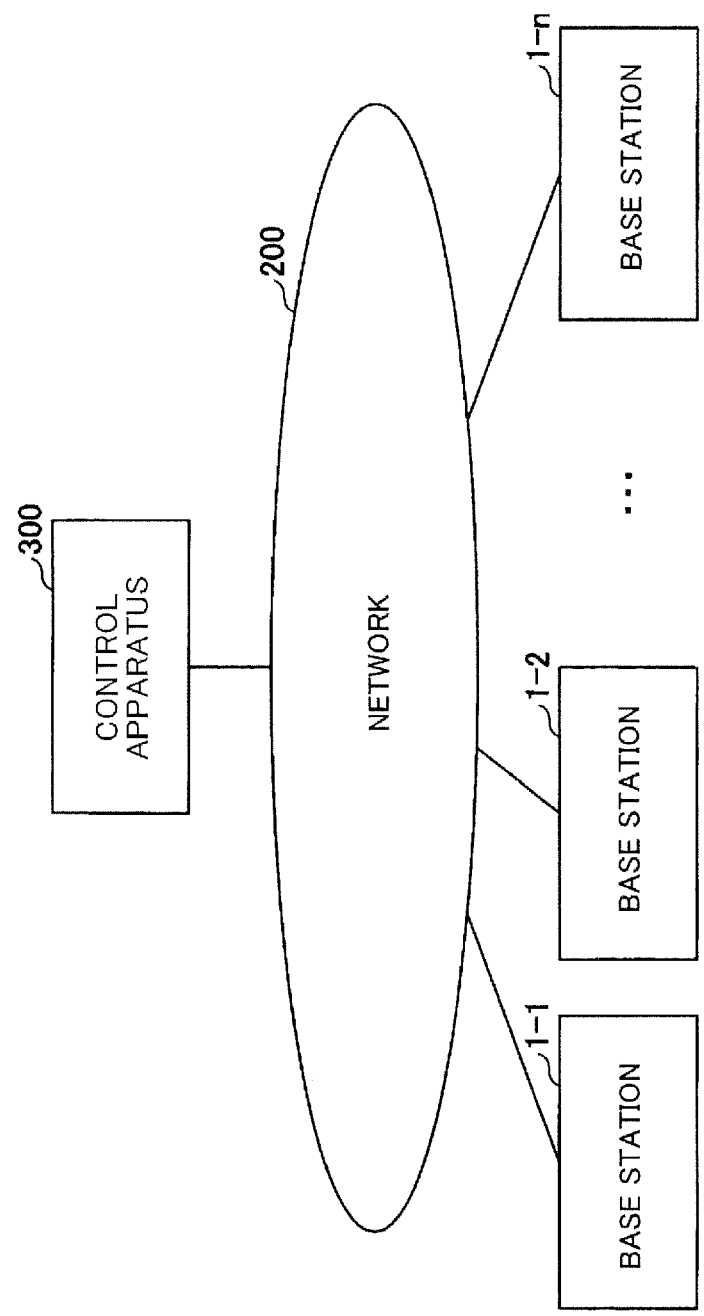

[Fig. 2]
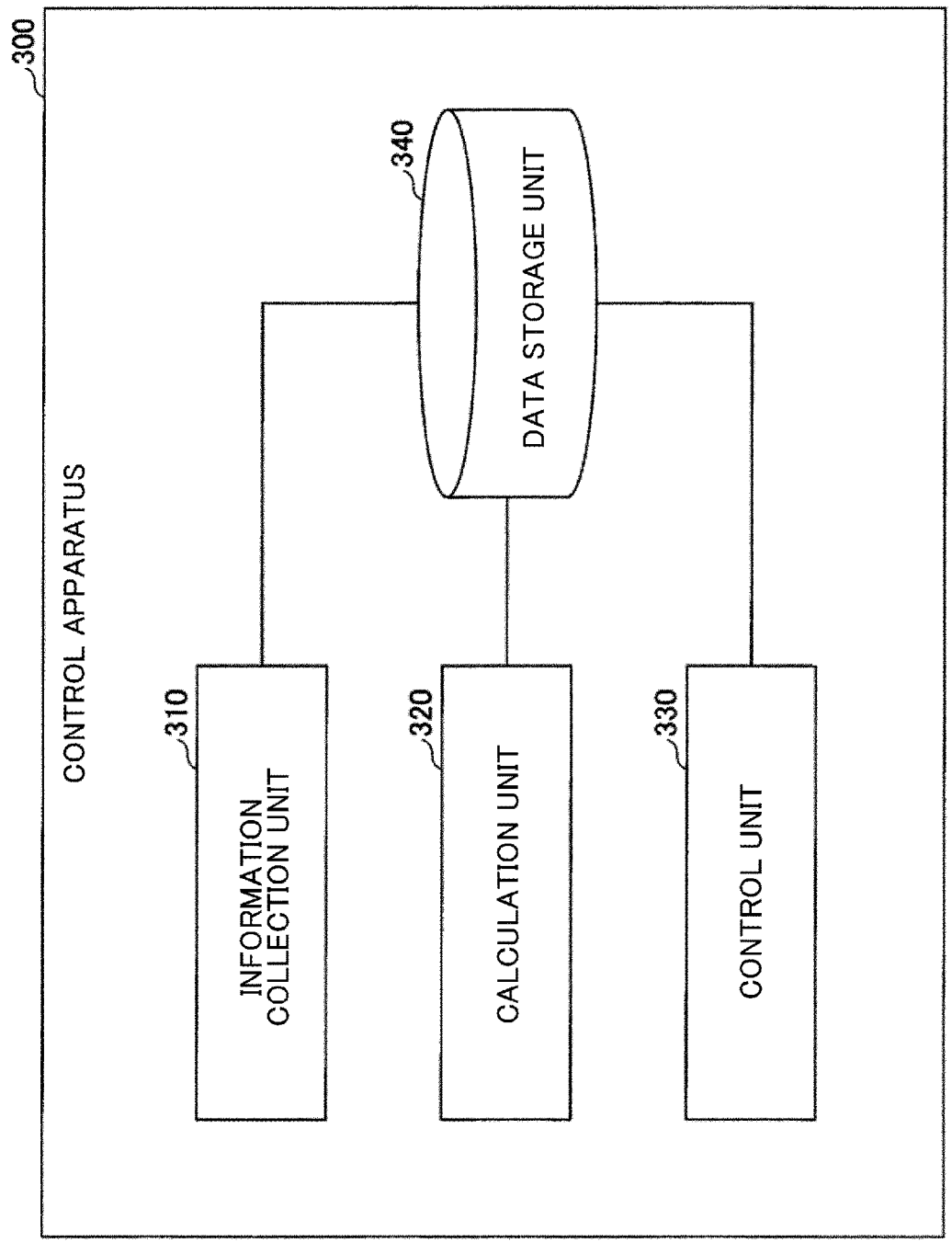

[Fig. 3]
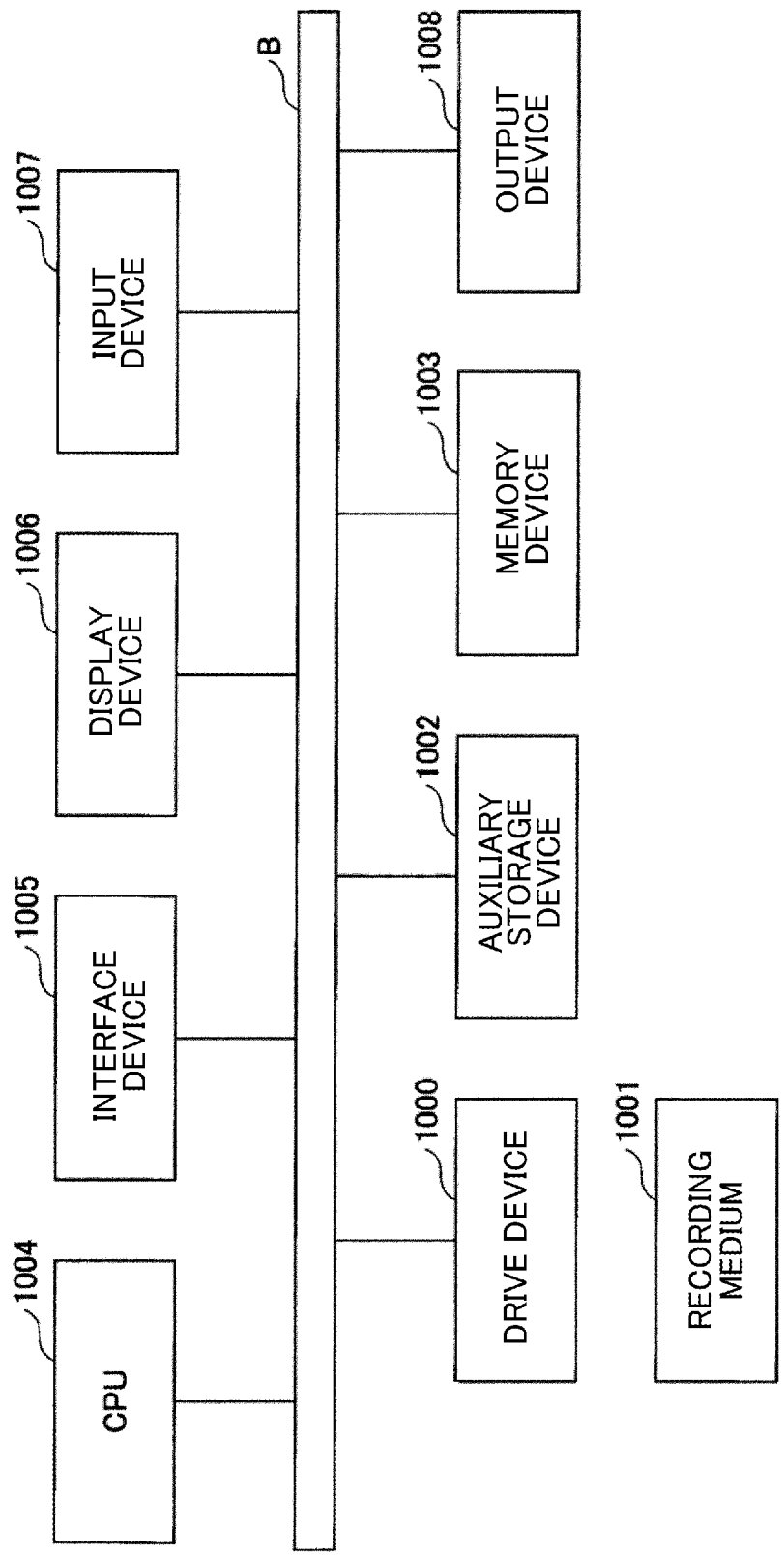

[Fig. 4]
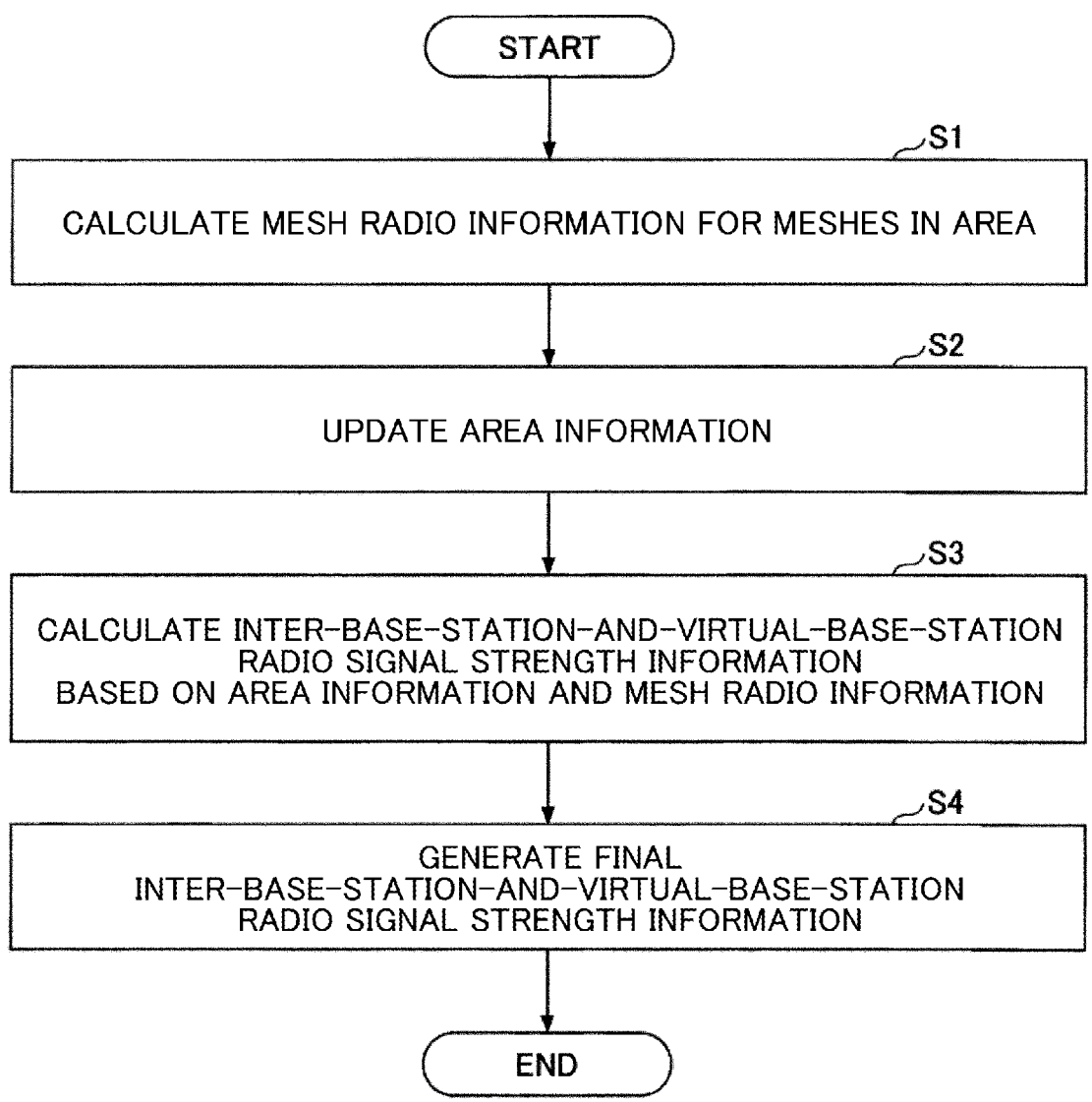

[Fig. 5]
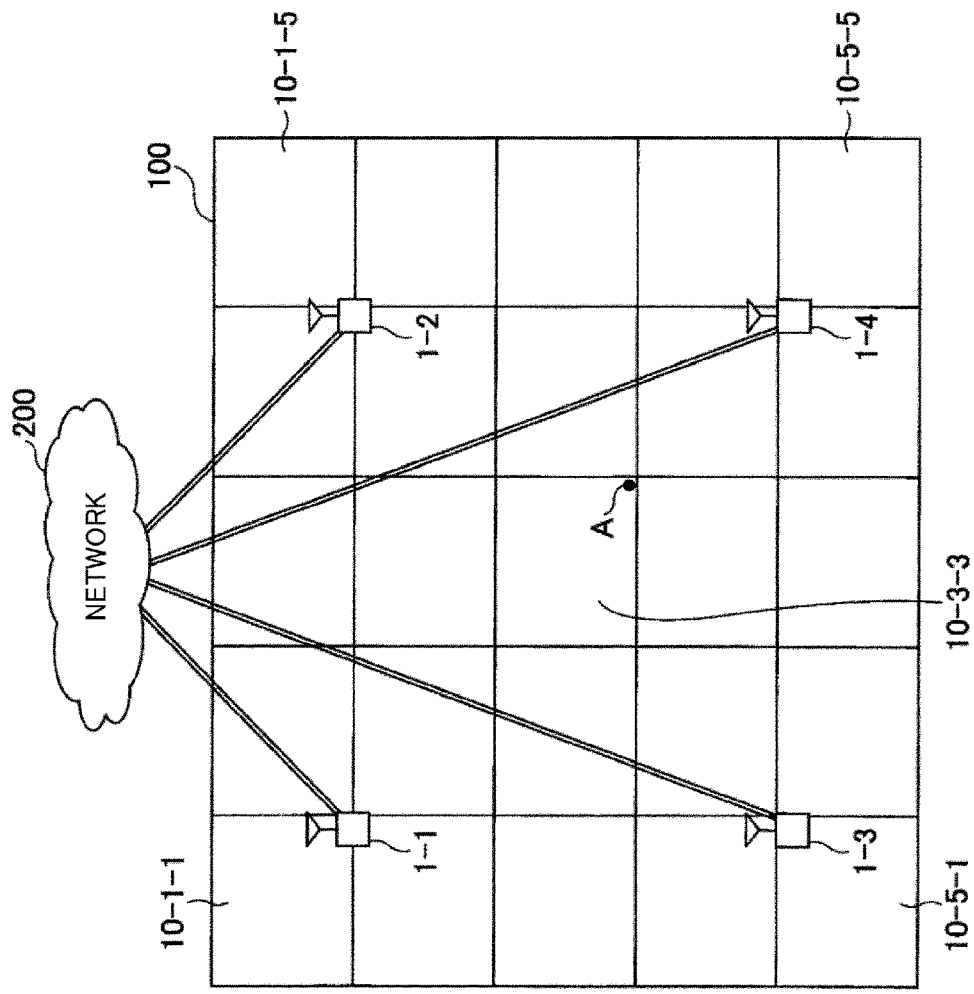

[Fig. 6]

| MESH | RECEPTION POWER (dBm) | | | |
|---|---|---|---|---|
| | 1-1 | 1-2 | 1-3 | 1-4 |
| 10-1-1 | -50 | -70 | -72 | -85 |
| 10-1-2 | -48 | -67 | -71 | -84 |
| ⋮ | ⋮ | ⋮ | ⋮ | ⋮ |
| 10-5-5 | -88 | -69 | -71 | -46 |

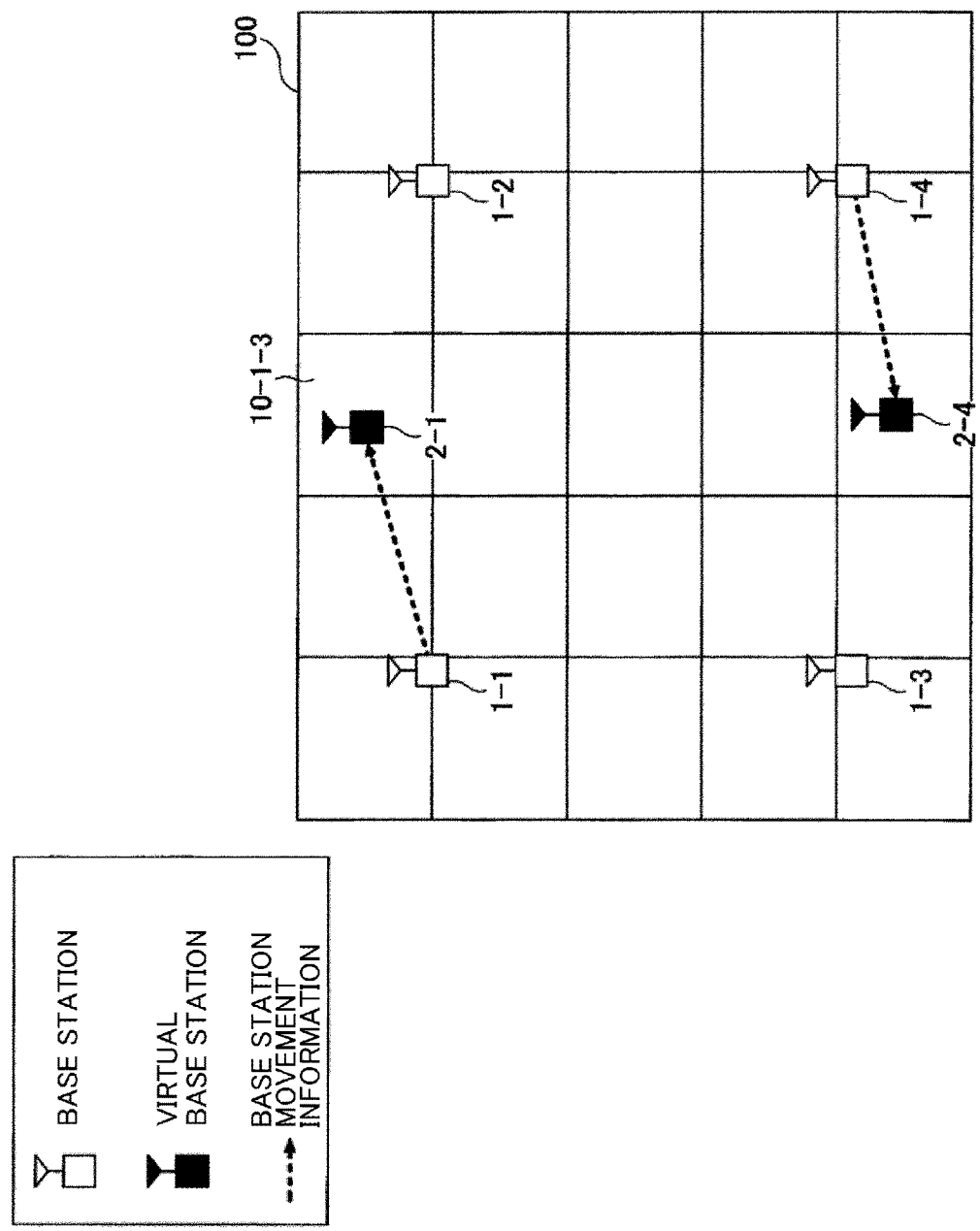
[Fig. 7]

[Fig. 8]

| BASE STATION/ VIRTUAL BASE STATION | 1-1 | ... | 1-4 | 2-1 | 2-4 |
|---|---|---|---|---|---|
| 1-1 | - | ⋮ | -81 | - | -80 |
| ⋮ | ⋮ | ⋮ | ⋮ | ⋮ | ⋮ |
| 1-4 | -81 | ⋮ | - | -68 | - |
| 2-1 | - | ⋮ | -68 | - | -60 |
| 2-4 | -80 | ⋮ | - | -60 | - |

- : DO NOT CALCULATE (BETWEEN STATION AND ITS OWN SELF)  (UNIT: dBm)

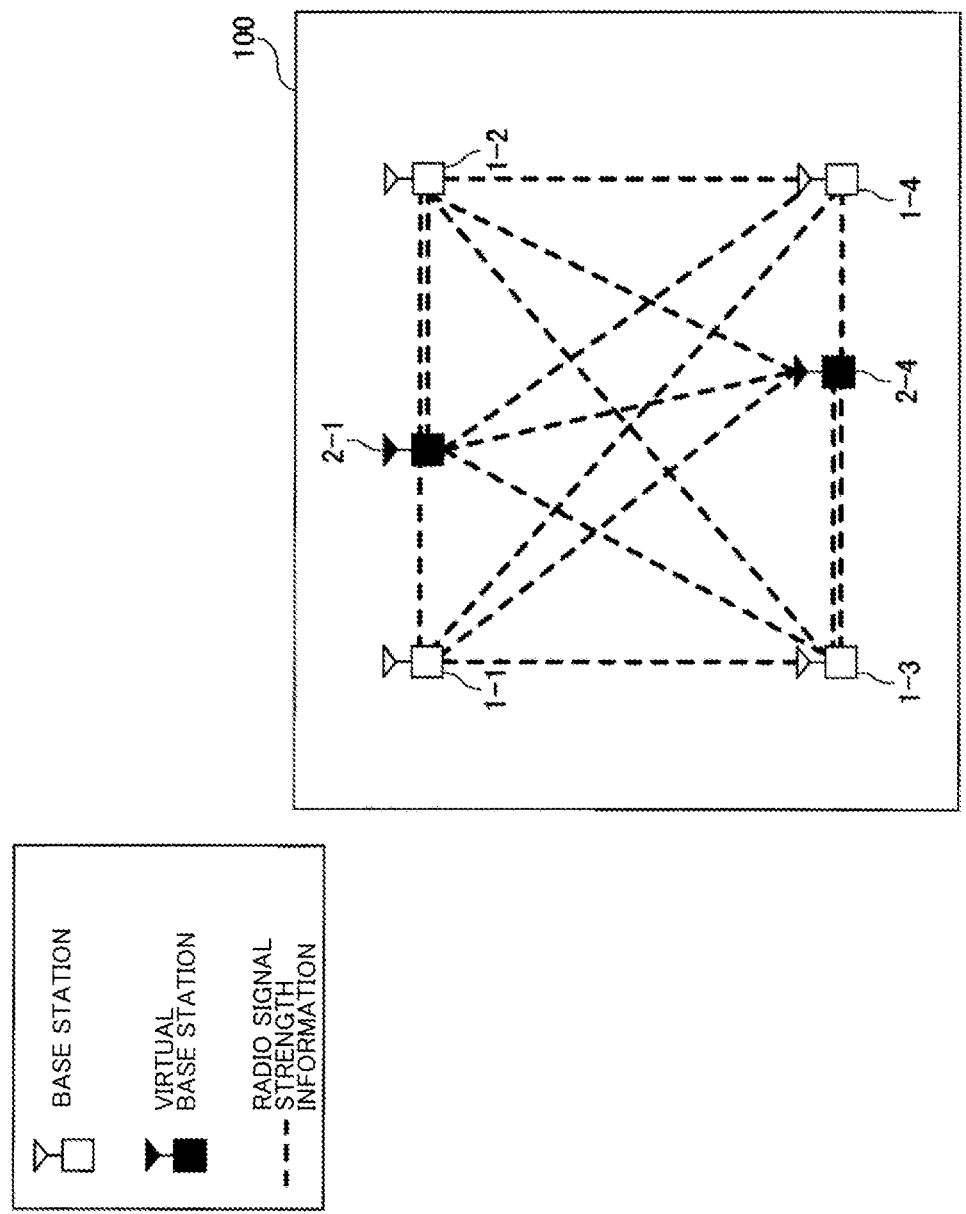
[Fig. 9]

[Fig. 10]
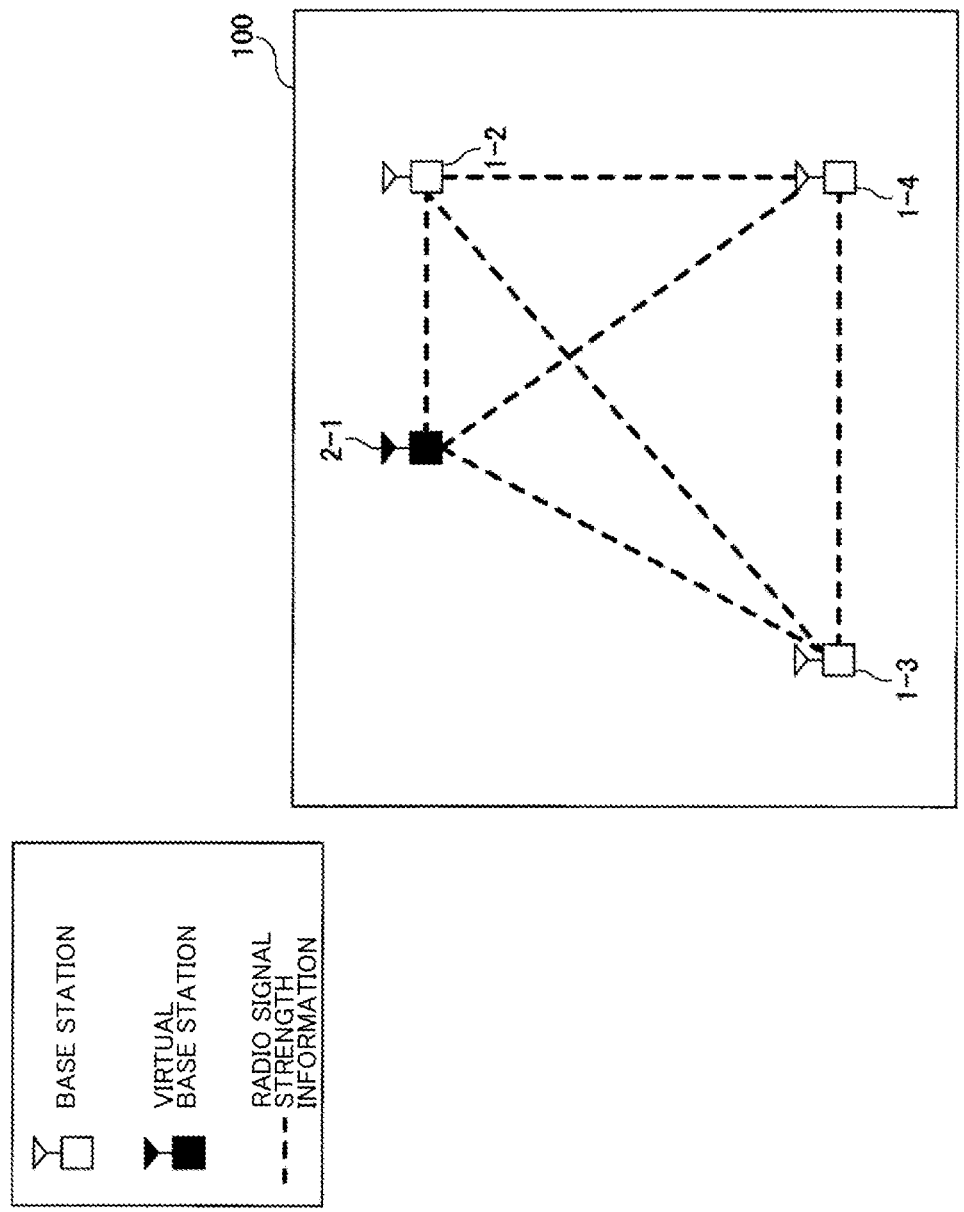

RADIO SIGNAL STRENGTH INFORMATION CALCULATION METHOD, CONTROL APPARATUS AND PROGRAM

TECHNICAL FIELD

The present invention relates to a technology for calculating a radio signal strength between base stations.

BACKGROUND ART

In recent years, users who use large-volume contents with radio terminals have increased with rapid popularization of radio terminals such as smartphones and tablets, and the volume of traffic in radio networks has rapidly increased.

To accommodate radio traffic at low cost and readily, high-speed radio access systems using radio waves in a band in which a radio system license is unnecessary have become widespread. Many high-speed radio access systems use the IEEE 802.11 wireless LAN standard disclosed in Non Patent Literature 1. Wireless LAN networks based on the standard have been provided in various areas including private areas such as homes and offices and public areas such as stores, stations, and airports.

When wireless LAN networks are constructed, it is necessary to construct the wireless LAN networks in consideration of various factors such as wireless LAN communication sections such as construction of radio base station apparatuses and parameter settings, network sections such as a network between radio base stations and switches and a network between switches and backhaul lines, and high-level service sections such as user authentication and portal screens.

In general, when radio signals attenuate due to propagation distances or obstructions in radio communication, quality or volume of radio communication is reduced. Therefore, states in which a distance between a radio base station and a radio terminal station is short and a propagation path is not obstructed are preferable. On the other hand, since the number of radio base stations that can be installed is restricted due to costs incurred for apparatuses, installation, and running, radio wave interference, and the like, it is important to install a required number of radio base stations at appropriate locations in an area that is covered by a wireless LAN. Further, since there is limitation in traffic and the number of users that can be accommodated by one radio base station, a movable base station using radio connection in a backhaul line may be installed in the area.

As a scheme of calculating a position at which a movable base station is to be installed, for example, Non Patent Literature 2 proposes a technology for dynamically changing positions of radio base stations according to a change in a user distribution in the area. A position at which a movable base station is to be installed is calculated in accordance with a position of a user within the area by using a clustering scheme called k-means disclosed in Non Patent Literature 3.

CONVENTIONAL ART LITERATURE

Non Patent Literature

Non Patent Literature 1: IEEE Std 802.11-2016, Dec. 2016. Non Patent Literature 2: Takuto Arai, Daisuke Goto, Masashi iwabuchi, Tatsuhiko iwakuni, Kazuki Maruta, "Proposal of adaptive movable AP System for realizing offloading efficiency enhancement," IEICE technical report, RCS2016-43, pp. 107 to 112, May. 2016.

Non Patent Literature 3: J. Macqueen, "SOME METHODS FOR CLASSIFICATION AND ANALYSIS OF MULTIVARIATE OBSERVATIONS," Proc. of 5th Berkeley Symposium on Mathematical Statistics and Probability, pp. 281 to 297, 1967.

SUMMARY OF INVENTION

Problem to be Solved by Invention

When a movable base station is used, as described above, a relationship of radio signal strengths between base stations in the same area is changed due to movement of the base station. Therefore, it is necessary to ascertain a radio signal strength at an installation position after the movement of the base station and adjust radio parameters accordingly.

In a method of the conventional art, information is collected after movement of a base station and a radio signal strength between base stations is ascertained. Therefore, information regarding the radio signal strength cannot be ascertained until the base station is moved. Therefore, radio parameters could not be adjusted in time and radio quality of a terminal may deteriorate due to the movement of the base station.

The present invention has been made in view of the above-mentioned circumstances and an objective of the present invention is to provide a technology enabling information regarding a radio signal strength between base stations to be ascertained before one of the base stations is moved to a target position in a case where the one of the base stations in a radio communication system is to be moved.

Solution to Problem

According to the disclosed technology, there is provided a radio signal strength information calculation method performed by a control apparatus, the method including:
 a generation step of calculating radio information regarding each of a plurality of meshes into which an area where base stations are placed is divided and generating mesh radio information; and
 a calculation step of placing a virtual base station at a position to where any of the base stations would be moved in the area, and calculating radio signal strength information between a plurality of base stations including the base stations and the virtual base station based on the mesh radio information.

Advantageous Effects of Invention

According to the disclosed technology, it is possible to ascertain information regarding a radio signal strength between base stations before one of the base stations is moved to a target position in a case where one of the base stations in a radio communication system is to be moved.

BRIEF DESCRIPTION OF DRAWINGS

FIG. 1 is a diagram illustrating an overall configuration of a system according to an embodiment of the present invention.

FIG. 2 is a diagram illustrating a functional configuration of a control apparatus 300.

FIG. 3 is a diagram illustrating a hardware configuration of the apparatus.

FIG. 4 is a flowchart illustrating an operation of the control apparatus 300.

FIG. 5 is a diagram illustrating an example of area information.

FIG. 6 is a diagram illustrating an example of mesh radio information.

FIG. 7 is a diagram illustrating an example of area information in which virtual base stations and base station movement information are reflected.

FIG. 8 is a diagram illustrating a calculation example of inter-base-station-and-virtual-base-station radio signal strength information.

FIG. 9 is a diagram illustrating a calculation example of the inter-base-station-and-virtual-base-station radio signal strength information.

FIG. 10 is a diagram illustrating a calculation example of the inter-base-station-and-virtual-base-station radio signal strength information.

MODE FOR CARRYING OUT INVENTION

Hereinafter, an embodiment of the present invention (the present embodiment) will be described with reference to the drawings. Embodiments to be described below are merely examples, and the embodiments to which the present invention is applied are not limited to the following embodiments.

In the following description, radio base stations are referred to as "base stations" and each base station is assumed to be movable. Base stations according to the present embodiment are, for example, base stations (access points) of a wireless LAN described in Non Patent Literature 1, but the present invention is not limited thereto. For example, the base stations according to the present embodiment may be base stations in radio access technology such as 5G, LTE, or 3G.

(System Configuration Example)

FIG. 1 illustrates an example of an overall configuration of a radio communication system according to the present embodiment. As illustrated in FIG. 1, a plurality of base stations 1-1 to 1-n are provided in a predetermined area, and each base station is connected to a network 200 wirelessly or by wire. There are terminals (not illustrated) belonging to each base station.

Each base station is an existing base station and can wirelessly communicate with a terminal and can communicate with another base station, an application server, and the like via the network 200. The network 200 is, for example, the Internet, a core network of a mobile network, or the like.

In addition, a control apparatus 300 is connected to the network 200. The control apparatus 300 is an apparatus that has functions according to the present invention, calculates radio signal strength information in accordance with a method to be described below, and controls a base station or a terminal. The apparatus calculating the radio signal strength information may be different from the apparatus controlling a base station or a terminal.

(Apparatus Configuration Example)

FIG. 2 illustrates an example of a functional configuration of the control apparatus 300. As illustrated in FIG. 2, the control apparatus 300 includes an information collection unit 310, a calculation unit 320, a control unit 330, and a data storage unit 340.

The information collection unit 310 collects positional information of base stations, movement information of the base stations, and the like. The calculation unit 320 calculates radio signal strength information between the base stations. The control unit 330 performs radio parameter settings in the base stations, sends instructions (commands) to the base stations, sends instructions to the terminals, and the like. The data storage unit 340 stores the information collected by the information collection unit 310, information necessary for calculation by the calculation unit 320, and a calculation result.

<Hardware Configuration Example>

The control apparatus 300 can be realized, for example, by causing a computer to execute a program. This computer may be a physical computer or a virtual machine.

That is, the control apparatus 300 can be realized by executing a program corresponding to processing performed by the control apparatus 300 by using hardware resources such as a CPU and a memory built in the computer. The program can be recorded on a computer-readable recording medium (a portable memory or the like) to be stored or distributed. It is also possible to provide the program to the control apparatus 300 via a network such as the Internet or an electronic mail.

FIG. 3 is a diagram illustrating an example of a hardware configuration of the computer. The computer in FIG. 3 includes a drive device 1000, an auxiliary storage device 1002, a memory device 1003, a CPU 1004, an interface device 1005, a display device 1006, an input device 1007, and an output device 1008 which are connected to each other via a bus B.

The program realizing processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 via the drive device 1000. However, the program need not necessarily be installed from the computer-readable recording medium 1001 and may be downloaded from another computer via the network. The auxiliary storage device 1002 stores the installed program and also stores necessary files, data, and the like.

The memory device 1003 reads and stores the program from the auxiliary storage device 1002 when an instruction to start the program is given. The CPU 1004 realizes functions related to the control apparatus 300 in accordance with the program stored in the memory device 1003. The interface device 1005 is used as an interface for connection to a network and functions as a transmission unit and a reception unit. The display device 1006 displays a graphical user interface (GUI) or the like according to the program. The input device 1007 is configured with a keyboard, a mouse, a button, a touch panel, or the like and is used to input various operation instructions. The output device 1008 outputs a calculation result.

The "computer-readable recording medium" may also be a medium that dynamically retains a program in a short time, such as a communication line when the program is transmitted over a network such as the Internet or a communication line such as a telephone line, or a medium that retains a program for a given time, such as a volatile memory inside a computer system serving as a server or a client in that case. Also, the foregoing program may be a program that realizes some of the functions of the control apparatus 300.

(Operation Example)

Hereinafter, an example of operation of the control apparatus 300 according to the present embodiment will be described in accordance with a procedure of the flowchart illustrated in FIG. 4.

In the example of operation, an example in which radio signal strength information between base stations is calculated when one of the base stations is moved will be described. The radio signal strength information between the base stations to be calculated may be referred to as an estimated interference matrix.

The radio signal strength information between a base station A and a base station B includes a strength of a radio signal (which may be referred to as "reception power") received from the base station B by the base station A and a strength of a radio signal received from the base station A by the base station B. Radio parameters of each base station can be adjusted in accordance with the radio signal strength information between the base stations. The radio parameters are, for example, a frequency channel, a transmission output, and the like.

For example, when it is found that, as a certain base station is moved, a radio signal at a frequency channel used for transmission by the base station causes large interference to an adjacent base station, the radio parameters are adjusted in such a manner that the frequency channel used by the base station is changed to another frequency channel or the transmission output is lowered.

FIG. 5 illustrates an example of a configuration of an area which is assumed for calculating the radio signal strength information between the base stations. As illustrated in FIG. 5, an area 100 in which the base stations can be installed is divided into 25 meshes 10-1-1 to 10-5-5, and the four base stations 1-1 to 1-4 connected to the network 200 are installed at illustrated positions in the area 100. The number of meshes and the number of the base stations are examples. The length of one side of each mesh is assumed to be about 5 to 10 m, but may be shorter or longer.

In the data storage unit 340 of the control apparatus 300, information corresponding to the configuration illustrated in FIG. 5 is stored as area information. The area information includes a size and a position of the area, information regarding the meshes (the number of divisions of the area), the position of each base station, and information (an IP address or the like) regarding a network to which each base station is connected.

The information regarding the area, the meshes, and the network is stored in advance, for example, in the data storage unit 340 by a system administrator. The positional information of each base station is updated at any time with a movement of the base station. For the positional information of each base station, for example, the base station transmits its own positional information to the control apparatus 300, and the information collection unit 310 of the control apparatus 300 acquires the positional information and stores the positional information in the data storage unit 340 (updates the area information).

As will be described below, the area information includes information regarding the actual base stations and information (positional information or the like) regarding a virtual base station.

The data storage unit 340 also stores radio information necessary to calculate mesh radio information to be described below. Hereinafter, description will be made in accordance with the flow of FIG. 4.

<S1>

In S1 (step 1) of the flow of FIG. 4, the calculation unit 320 of the control apparatus 300 calculates mesh radio information for each mesh based on the area information read from the data storage unit 340 and stores the calculated mesh radio information in the data storage unit 340.

An example of the calculated mesh radio information is illustrated in FIG. 6. As illustrated in FIG. 6, the mesh radio information includes reception power from the base stations in each mesh. The reception power is an example of radio information. The mesh radio information can be calculated using radio information measured in advance in the area, information calculated by a radio wave propagation simulation based on the area information, or the like. The mesh radio information is updated at any time with a movement of any of the actual base stations.

For example, in FIG. 6, the reception power in the mesh 10-1-1 from the base station 1-1 is denoted as −50 dBm.

The reception power of each mesh in the mesh radio information is the reception power received by a base station when it is assumed that the base station is placed at the central position of each mesh. For example, for a case where a base station at the central position of the mesh 10-1-1 receives a radio signal transmitted from the base station 1-1, the calculation unit 320 can calculate the reception power of the base station at the central position of the mesh 10-1-1 by a radio wave propagation simulation assuming transmission power of the base station 1-1, a transmission antenna gain, and a reception antenna gain of the base station on the reception side.

In this regard, the use of the central position of the mesh is an example, and reception power at a position other than the central position may be used instead. For example, reception power from a base station in each mesh may be defined as the reception power at a position at which the reception power from the base station is the maximum in the area of the mesh. In this way, interference in the worst case can be estimated by thus using the maximum reception power.

As an example, when the mesh 10-3-3 and the base station 1-4 illustrated in FIG. 5 are focused on and, for a case where the reception power from the base station 1-4 is the maximum at a point A in the mesh 10-3-3, the maximum reception power is used as the reception power from the base station 1-4 in the mesh 10-3-3.

<S2>

In S2, the information collection unit 310 first acquires base station movement information. The base station movement information may be, for example, a target position or other information (such as a speed) of movement with regard to a base station which is moved (or a base station which is scheduled to be moved). The base station movement information may be information which is input to the control apparatus 300 by a system administrator.

In this regard, although the base station which is moved (or the base station which is scheduled to be moved) has not actually completed the movement corresponding to the base station movement information, the base station at a position to where the base station would be moved as a result of completing the movement corresponding to the base station movement information is referred to as a "virtual base station." The base station which has actually completed the movement corresponding to the base station movement information may also be referred to as a "virtual base station" in some cases.

Based on the present area information (including information regarding a base station in a case where the base station has actually been moved) and the base station movement information, the calculation unit 320 places the virtual base station in the area 100, updates the area information accordingly, and stores the updated area information in the data storage unit 340. The updated area information includes positional information of the virtual base station, in addition to the area information that is one before being updated.

FIG. 7 illustrates an example in which the area information including the virtual base stations that have been moved based on the base station movement information is denoted.

In the example illustrated in FIG. 7, it is denoted that a virtual base station 2-1 and a virtual base station 2-4 are placed at destinations to where the base station 1-1 and the base station 1-4 are moved based on the base station movement information, respectively.
<S3>

In S3, the calculation unit 320 reads the area information updated in S2 and the present mesh radio information from the data storage unit 340 and calculates inter-base-station-and-virtual-base-station radio signal strength information based on the area information and the mesh radio information. The inter-base-station-and-virtual-base-station radio signal strength information includes radio signal strength information between base stations and virtual base stations corresponding to other base stations that have been moved, and radio signal strength information between base stations that are different from each other.

As an example, a case in which the radio signal strength information between the base station 1-3 and the virtual base station 2-1 is calculated will now be described.

The calculation unit 320 ascertains that there is the virtual base station 2-1 in the mesh 10-1-3 based on the updated area information (for example, FIG. 7). In this regard, it is assumed that the mesh radio information includes "−70" as the reception power from the base station 1-3 in the mesh 10-1-3. The calculation unit 320 calculates from the mesh radio information the radio signal strength −70 from the base station 1-3 to the virtual base station 2-1 (the mesh 10-1-3).

In the present embodiment, it is assumed that radio wave propagation characteristics from a base station A to a base station B are the same as radio wave propagation characteristics from the base station B to the base station A, and a transmission output (transmission power), a reception antenna gain, and a transmission antenna gain are the same between these base stations. Therefore, it is assumed that the radio signal strength from the base station A to the base station B is the same as the radio signal strength from the base station B to the base station A.

Accordingly, in a case where the calculation unit 320 calculates the radio signal strength from the base station 1-3 to the virtual base station 2-1 as −70, the radio signal strength from the virtual base station 2-1 to the base station 1-3 is also assumed as −70. However, the foregoing assumption is an example.

FIG. 8 illustrates an example of a calculation result of the inter-base-station-and-virtual-base-station radio signal strength information in S3. The calculation result is stored in the data storage unit 340. FIG. 8 illustrates, for example, a radio signal strength −81 from the base station 1-4 to the base station 1-1 and a radio signal strength −81 from the base station 1-1 to the base station 1-4. FIG. 9 is a diagram illustrating pairs of base stations and virtual base stations from which the radio signal strength information in FIG. 8 is calculated.

A radio signal strength between a base station and its own self is not calculated. Therefore, for example, a radio signal strength between the base station 1-1 and its own self 1-1 is not calculated, and also, a radio signal strength between the base station 1-1 and the virtual base station 2-1 corresponding to the base station 1-1 after being moved is not calculated.

As described above, as a radio signal strength from a base station or from a virtual base station to another base station or another virtual base station, the reception power in the mesh radio information from the corresponding base station to the corresponding mesh can be used. In this regard, in the case where, as the reception power in the mesh radio information, the reception power at the center of a mesh is used and a position of a virtual base station located in a mesh A is located at a position distant from the center of the mesh A (for example, near a corner of the mesh A), the reception power of the mesh A and the reception power of a mesh (different from the mesh A) having the center closest to the position of the virtual base station may be used (for example, an average of the reception power of both may be used) to calculate the radio signal strength (the reception power) of the virtual base station.
<S4>

In S4, based on the area information (including the information regarding actually moved base stations) and the inter-base-station-and-virtual-base-station radio signal strength information (for example, FIGS. 8 and 9), the calculation unit 320 selects information regarding the actually moved virtual base stations which have actually performed movements corresponding to the base station movement information from among the virtual base stations and generates inter-base-station-and-virtual-base-station radio signal strength information with regard to the actually moved virtual base stations. The generated inter-base-station-and-virtual-base-station radio signal strength information is stored in the data storage unit 340.

For example, in a case where the base station 1-1 illustrated in FIG. 9 has actually been moved and is located at the position "virtual base station 2-1" and the base station 1-4 has not been moved as it was, the calculation unit 320 generates the inter-base-station-and-virtual-base-station radio signal strength information illustrated in FIG. 10. Since the inter-base-station-and-virtual-base-station radio signal strength information has been already calculated (see FIG. 8), selecting (extracting) information regarding the actually moved virtual base station from the information of FIG. 8 is performed in S4.

<Adjustment of Radio Parameters>

Since the inter-base-station-and-virtual-base-station radio signal strength information has been already calculated in the stage of S3 before actual movement of base stations to target positions, the inter-base-station-and-virtual-base-station radio signal strength information at the time when the base stations have actually been moved can be used immediately after the movement of the base stations and the radio parameters for each base station can be adjusted immediately after the movement of the base station.

The adjustment of the radio parameters is performed in such a manner that, for example, the control unit 330 of the control apparatus 300 acquires the inter-base-station-and-virtual-base-station radio signal strength information calculated in S4 from the data storage unit 340, calculates radio parameters (which may also be called radio setting information) of each base station by using the acquired radio signal strength information, and sets thus updated radio parameters in any base stations requiring an update of the radio parameters.

Since the inter-base-station-and-virtual-base-station radio signal strength information has been calculated before the movement of the base stations, the radio parameters of each base station may be determined before the movement of the base station and the radio parameters may be set in each base station (the base station requiring an update of the parameters) during the movement of the base station.

<Action to Connected Terminal>

When an amount of movement of a base station is large at a time of the movement of the base station, a terminal which is in a cover area of the base station before the movement may come to be out of the cover area of the moved base station. Therefore, the terminal which is currently connected to the base station may be disconnected from the base station; or the terminal which is newly connected during the movement of the base station to a destination may be disconnected from the base station immediately.

Therefore, the control unit 330 of the control apparatus 300 may transmit an instruction, for handover to another base station, to the terminal which is currently connected to the base station which is to be moved, immediately before the base station starts being moved or during the movement of the base station, based on the base station movement information. The control unit 330 may transmit a command to the base station to which the terminal is currently connected to cause the base station to transmit an instruction to the terminal for handover to another base station.

The control unit 330 may transmit an instruction to a terminal which is newly connected to a base station which is currently being moved, to inhibit connection of the terminal to the base station. The control unit 330 may transmit a command to the base station (which is currently being moved) to which a terminal is newly connected, to cause the base station to transmit an instruction to the terminal to inhibit connection of the terminal to the base station.

Connection control such as sending a handover instruction for a terminal which is currently connected and connection control (connection inhibition) for a terminal which is newly connected both may be performed or any one thereof may be performed.

Advantageous Effects of Embodiment

As described above, in the disclosed technology according to the present embodiment, it is possible to ascertain information regarding a radio signal strength between base stations before any of the base stations is moved to a target position in a case where the base station in a radio communication system is to be moved.

Summary of Embodiment

The present specification discloses, at least, radio signal strength information calculation methods, control apparatuses, and programs described in each of the following clauses.

(Clause 1)
A radio signal strength information calculation method performed by a control apparatus, the method including: a generation step of calculating radio information regarding each of a plurality of meshes into which an area where base stations are placed is divided and generating mesh radio information; and
  a calculation step of placing a virtual base station at a position to where any of the base stations would be moved in the area, and calculating radio signal strength information between a plurality of base stations including the base stations and the virtual base station based on the mesh radio information.

(Clause 2)
The radio signal strength information calculation method according to Clause 1,
  wherein, in the calculation step, based on the mesh radio information, reception power in a mesh corresponding to a position of the virtual base station from any of the base stations is set to a strength of a radio signal received from the any of the base stations by the virtual base station and to a strength of a radio signal received from the virtual base station by the any of the base stations.

(Clause 3)
The radio signal strength information calculation method according to Clause 1 or 2,
  wherein, in the calculation step, each of the any of the base stations which would be moved and the virtual base station is regarded as own self of another, and the radio signal strength information between the any of the base stations which would be moved and the virtual base station, each of which is regarded as own self of another, is not calculated.

(Clause 4)
The radio signal strength information calculation method according to any one of Clauses 1 to 3, the method further including:
  a step of calculating radio setting information regarding any of the base stations which has been moved based on the radio signal strength information; and
  a step of (i) causing any of the base stations which is to be moved to perform connection control for a terminal which is currently connected to the any of the base stations which is to be moved or (ii) causing any of the base stations which is currently being moved to perform connection control for a terminal which is newly connected to any of the base stations which is currently being moved or (iii) performing both of (i) and (ii).

(Clause 5)
A control apparatus in a radio communication system, the control apparatus including a calculation unit configured to calculate radio information regarding each of a plurality of meshes into which an area where base stations are placed is divided and generate mesh radio information, and
  place a virtual base station at a position to where any of the base stations would be moved in the area, and calculate radio signal strength information between a plurality of base stations including the base stations and the virtual base station based on the mesh radio information.

(Clause 6)
The control apparatus according to Clause 5, further including:
  a control unit configured to calculate radio setting information regarding any of the base stations which has been moved based on the radio signal strength information; and (i) cause any of the base stations which is to be moved to perform connection control for a terminal which is currently connected to the any of the base stations which is to be moved or (ii) cause any of the base stations which is currently being moved to perform connection control for a terminal which is newly connected to the any of the base stations which is currently being moved or (iii) perform both of (i) and (ii).

(Clause 7)
A program causing a computer to function as each unit of the control apparatus according to Clause 5 or 6.

Although the embodiment has been described above, the present invention is not limited to such a specific embodiment, and various modifications and/or changes can be made within the scope of the spirit of the present invention described in the claims.

DESCRIPTION OF SIGNS

1-1 to 1-n Base stations
10-1-1 to 10-5-5 Meshes

100 Area
200 Network
300 Control apparatus
310 Information collection unit
320 Calculation unit
330 Control unit
340 Data storage unit
1000 Drive device
1001 Recording medium
1002 Auxiliary storage device
1003 Memory device
1004 CPU
1005 Interface device
1006 Display device
1007 Input device

The invention claimed is:

1. A radio signal strength information calculation method performed by a control apparatus, the radio signal strength information calculation method comprising:
calculating radio information regarding each of a plurality of meshes into which an area where base stations are placed is divided and generating mesh radio information, said mesh radio information being calculated by a radio wave propagation simulation based on area information, said area information including a size and a position of the area, information regarding the plurality of the meshes, a position of each base station, and information regarding a network to which each base station is connected; and
placing a virtual base station at a position to where any of the base stations would be moved in the area, and calculating radio signal strength information between a plurality of base stations including the base stations and the virtual base station based on the mesh radio information.

2. The radio signal strength information calculation method according to claim 1,
wherein, in the calculating, based on the mesh radio information, reception power in a mesh corresponding to the position of the virtual base station from any of the base stations is set to a strength of a radio signal received from the any of the base stations by the virtual base station and to a strength of a radio signal received from the virtual base station by the any of the base stations.

3. The radio signal strength information calculation method according to claim 1,
wherein, in the calculating, each of the any of the base stations which would be moved and the virtual base station is regarded as own self of another, and the radio signal strength information between the any of the base stations which would be moved and the virtual base station, each of which is regarded as own self of another, is not calculated.

4. The radio signal strength information calculation method according to claim 1, the method further comprising:
calculating radio setting information regarding any of the base stations which has been moved based on the radio signal strength information; and
(i) causing any of the base stations which is to be moved to perform connection control for a terminal which is currently connected to the any of the base stations which is to be moved or (ii) causing any of the base stations which is currently being moved to perform connection control for a terminal which is newly connected to the any of the base stations which is currently being moved or (iii) performing both of (i) and (ii).

5. A control apparatus in a radio communication system, the control apparatus comprising:
a processor; and
a memory that includes instructions, which when executed, cause the processor to perform the following steps:
calculating radio information regarding each of a plurality of meshes into which an area where base stations are placed is divided and generating mesh radio information, said mesh radio information being calculated by a radio wave propagation simulation based on area information, said area information including a size and a position of the area, information regarding the plurality of the meshes, a position of each base station, and information regarding a network to which each base station is connected, and
placing a virtual base station at a position to where any of the base stations would be moved in the area, and calculating radio signal strength information between a plurality of base stations including the base stations and the virtual base station based on the mesh radio information.

6. The control apparatus according to claim 5,
wherein the instructions, when executed, cause the processor to further perform calculating radio setting information regarding any of the base stations which has been moved based on the radio signal strength information; and (i) causing any of the base stations which is to be moved to perform connection control for a terminal which is currently connected to the any of the base stations which is to be moved or (ii) causing any of the base stations which is currently being moved to perform connection control for a terminal which is newly connected to the any of the base stations which is currently being moved or (iii) performing both of (i) and (ii).

7. A non-transitory computer-readable recording medium having computer-readable instructions stored therein, which when executed, cause a computer to:
calculate radio information regarding each of a plurality of meshes into which an area where base stations are placed is divided and generate mesh radio information, said mesh radio information being calculated by a radio wave propagation simulation based on area information, said area information including a size and a position of the area, information regarding the plurality of the meshes, a position of each base station, and information regarding a network to which each base station is connected, and
place a virtual base station at a position to where any of the base stations would be moved in the area, and calculate radio signal strength information between a plurality of base stations including the base stations and the virtual base station based on the mesh radio information.

* * * * *